United States Patent [19]

Bennett

[11] Patent Number: 5,692,083

[45] Date of Patent: Nov. 25, 1997

[54] IN-LINE UNITARY OPTICAL DEVICE MOUNT AND PACKAGE THEREFOR

[75] Inventor: Christopher K. Bennett, Hamilton, N.J.

[73] Assignee: The Whitaker Corporation, Wilmington, Del.

[21] Appl. No.: 614,602

[22] Filed: Mar. 13, 1996

[51] Int. Cl.⁶ .................................................. G02B 6/36
[52] U.S. Cl. .................................. 385/88; 385/93; 385/91
[58] Field of Search .................................. 385/84–94

[56] References Cited

U.S. PATENT DOCUMENTS

| | | | |
|---|---|---|---|
| 4,186,995 | 2/1980 | Schumacher | 350/96.2 |
| 4,222,629 | 9/1980 | Dassele et al. | 350/96.2 |
| 4,273,413 | 6/1981 | Bendiksen et al. | 350/96.2 |
| 4,307,934 | 12/1981 | Palmer | 350/96.2 |
| 4,718,744 | 1/1988 | Manning | 350/96.2 |
| 4,756,590 | 7/1988 | Forrest et al. | 350/96.15 |
| 4,842,360 | 6/1989 | Caro et al. | 350/96.18 |
| 4,897,711 | 1/1990 | Blonder et al. | 357/74 |
| 4,911,519 | 3/1990 | Burton et al. | 350/96.2 |
| 4,935,856 | 6/1990 | Dragoon | 362/307 |
| 4,979,791 | 12/1990 | Bowen et al. | 350/96.17 |
| 5,042,891 | 8/1991 | Mulholland et al. | 385/93 |
| 5,056,881 | 10/1991 | Bowen et al. | 359/19 |
| 5,073,003 | 12/1991 | Clark | 385/33 |
| 5,127,075 | 6/1992 | Althaus et al. | 385/94 |
| 5,347,605 | 9/1994 | Isaksson | 385/92 |
| 5,495,545 | 2/1996 | Cina et al. | 385/92 |
| 5,515,468 | 5/1996 | DeAndrea et al. | 385/88 |
| 5,537,504 | 7/1996 | Cina et al. | 385/93 |

FOREIGN PATENT DOCUMENTS

| | | | |
|---|---|---|---|
| 0 375 251 | 6/1990 | European Pat. Off. | G02B 6/42 |
| 0 404 053 | 12/1990 | European Pat. Off. | G02B 6/42 |
| 35 43 558 | 12/1985 | Germany | G02B 6/42 |
| 3031808 | 2/1991 | Japan | G02B 6/42 |
| 2 162 336 | 1/1986 | United Kingdom . | |

OTHER PUBLICATIONS

European Search Report; European Patent Office; Application No. EP 94 30 1015.7.

Primary Examiner—Phan T. H. Palmer
Attorney, Agent, or Firm—W. Francos

[57] ABSTRACT

The present invention discloses a substantially co-linear header 100 for the alignment and packaging of an optoelectronic device 503 on an optical header with an optical fiber mounted in an optical fiber sleeve 101. The substantially co-linear arrangement of the optical sleeve with the integrally molded lens member 102 and the optoelectronic device 503, enables good performance characteristics through the elimination of reflective and refractive surfaces as disclosed in the prior art. Furthermore, the overall cost of assembly as well as of the materials required to effect the package of the present disclosure is substantially reduced over conventional design. The final result is a packaged optoelectronic device which is passively aligned to an optical fiber to effect optical communication therebetween a substantially reduced cost and improved performance characteristics.

4 Claims, 3 Drawing Sheets

IN-LINE UNITARY OPTICAL DEVICE MOUNT AND PACKAGE THEREFOR

BACKGROUND OF THE INVENTION

The present invention is related to U.S. patent application Ser. No. 08/388,664 filed Feb. 14, 1995, now U.S. Pat. No. 5,515,468. The invention of the present disclosure relates to a low cost mounting structure and package for an optoelectronic device having improved performance characteristics.

FIELD OF THE INVENTION

As optoelectronics become a viable alternative for the communications industry, large quantities of devices and systems are required to effect the optical links. Accordingly, the cost of the various components must be reduced to acceptable levels, in order to meet the industry needs at reasonable overall costs. However, while the cost must be reduced, there is an ever increasing need to maintain and improve the performance of the various elements of the system. In previous attempts to package optoelectronic devices such as light emitting devices and light receiving devices, a package was assembled in which a metal housing member housed the device disposed in TO style can as well as the necessary optical elements for coupling between an optoelectronic device and the optical fiber. In U.S. Pat. No. 4,979,791 to Bowen, et al, a typical package is disclosed for an in line link between an optoelectronic device in a TO can and an optical fiber. As can be appreciated from a review of the patent to Bowen, et al, the substantially co-linear relationship of the optical fiber, the optical elements and the optoelectronic device enables relatively good performance with minimal losses due to reflections and refractions of the various optical elements. However, the overall cost of such a package is driven to unacceptable levels due to the alignment requirements of the various optical elements of the package as well as the inherent costs of the various elements of the package. The former cost factor is due generally to the requirements for active alignment of the TO can with the optical elements and the fiber. As can be appreciated, large scale manufacture requiring active alignment to effect adequate performance drastically impacts the overall costs of the produced device. Furthermore, such a process can greatly affect yield because misaligned components in a final package must be discarded.

Efforts have been made to reduce the overall cost of the end product, without sacrificing performance, if not improving the overall performance of the packaged device. To this end, the initial effort in this area has been to reduce the inherent cost of various materials. In U.S. patent application Ser. No. 08/388,664, now U.S. Pat. No. 5,515,468, the disclosure of which is specifically incorporated herein by reference, a unitary plastic structure is disclosed to effect passive alignment and optical coupling of an optical fiber to a packaged optoelectronic device by way of integral optics. To this end, the plastic member of the above-referenced patent application has an alignment sleeve for the optical fiber which is in optical communication with molded optics for orienting light traveling in one direction in a fiber to an optoelectronic device which is oriented in a direction perpendicular to the orientation of the light in the optical fiber. These devices, known as light bending devices, have the ability to reduce the overall costs. However, as can be appreciated from a review of the above-referenced patent application, the multisurface structure of the molded optic link reduces the performance of the device through refractive and reflective losses. Therefore, it is clear that while strides have been made through the use of integrally molded optics to effect a lower cost overall end product, there is room for improvement of the performance of the package by simplification of the optics associated with the packaged device.

Accordingly, what is needed is an optoelectronic package having integrally molded optics to effect communication between an optoelectronic device and a optical fiber with as few optical surfaces as is necessary in order to properly effect the coupling between the optoelectronic device and the fiber. The ability to make an in-line package as well as to passively align the device to the fiber and optics will reduce the requirements for active alignment to a minimal level. As well, the use of the various materials will further improve the overall cost of the package product. To this end, the final result is a passively aligned product having packaging materials and optics materials that are much lower in cost than previously used resulting in a lower cost end product through reductions in input labor as well as well as materials, while improving the performance characteristics of the final product.

SUMMARY OF THE INVENTION

The present invention is an integrally molded in-line optical piece, having an optical sleeve for an optical fiber, an integrally molded lens, and a cavity for reception of an optical header. The preferred optical die header is a substrate of preferably ceramic and has an optoelectronic device mounted on a ceramic base, the base being mounted to the substrate. The header is adhesively fixed to the plastic active device mount assembly and has a base on which is mounted a ceramic layer with the device mounted thereon. The ceramic layer is passively aligned in a cavity in the integral active device mount utilized to effectively passively align the optical fiber to the optoelectronic device by way of the integrally molded lens. The resulting package achieves the desired performance due to the in-line optics at a substantially reduced cost due to the passive alignment and reduced cost of material.

OBJECTS, FEATURES, AND ADVANTAGES

It is an object of the present invention to have a low cost, high performance packaging assembly for an active device mount.

It is a feature of the present invention to have a unitary piece which enables passive alignment of an optoelectronic device to an optical fiber in an in-line manner.

It is a further feature of the present invention to have an integrally formed passive optical element on the unitary piece to effect optical communication between a fiber and an optoelectronic device.

It is an advantage of the present invention to have a passively aligned structure for the optical package.

DETAILED DESCRIPTION OF THE PREFERRED EMBODIMENT

Figure 1:
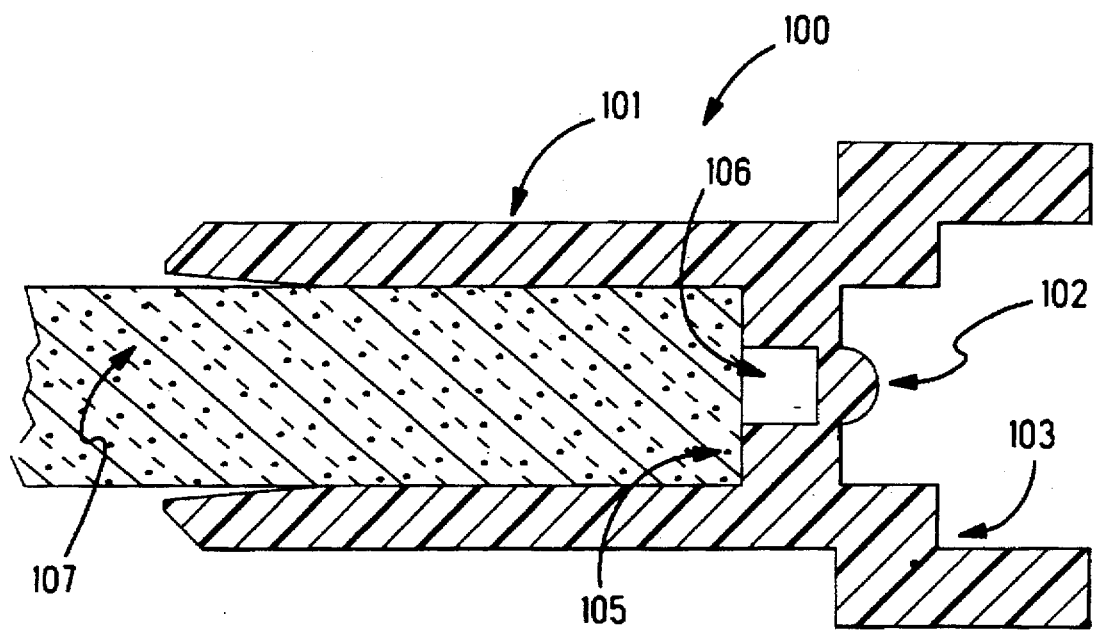
FIG. 1 is a cross sectional view of the integrally molded optical sleeve having the integrally molded lens and die receiving cavity.

Turning to FIG. 1 we see a cross sectional view of the active device mount of the present invention which is integrally molded of engineering plastic. To this end, the device mount has an optical sleeve 101 for receiving an optical fiber 107, as well as an integrally molded lens 102 and a cavity 103 for the reception of the optical header (not shown). The material for the active device mount is preferably Radel A 300 NT or any plastic resin in the high-temperature poly-carbonate family of materials while less preferred will suffice. Furthermore, those materials are as disclosed in U.S. patent application Ser. No. 08/388,664 (U.S. Pat. No. 5,515,468) will suffice. The step 105 serves as the stop for the optical fiber. This member 105 stops the fiber 107 at a predetermined distance from the lens to enable precise coupling between the fiber and the lens with the light traversing the air gap 106. The stop 105 enables the accurate passive alignment of the fiber to the lens and is an improvement over conventional stops which are often a separate molded piece which must be inserted by an assembly press. The integral stop 105 thereby simplifies assembly thus reducing cost. Finally, the lens 102 is preferably a convex lens although other lenses to include a ball lens or an ellipsoidal lens will suffice. Finally, a holographic optical element could be used. The technique for fabrication of the device mount having the integrally molded plastic sleeve and lens assembly are as is disclosed in the above-referenced patent application.

Figure 2:
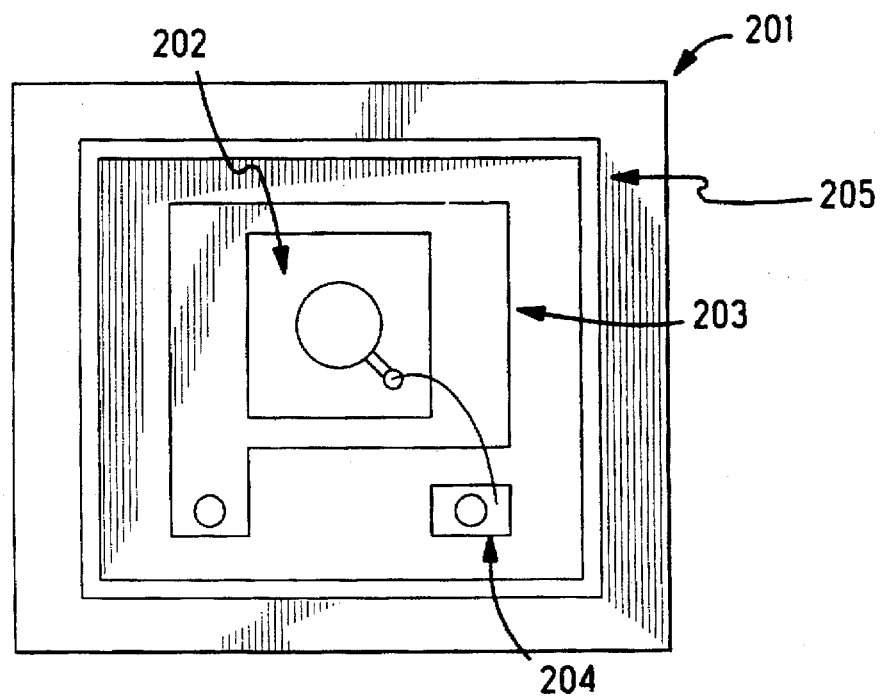
FIG. 2 is a top view of the optical die header having the optoelectronic device mounted thereon.
Figure 3:
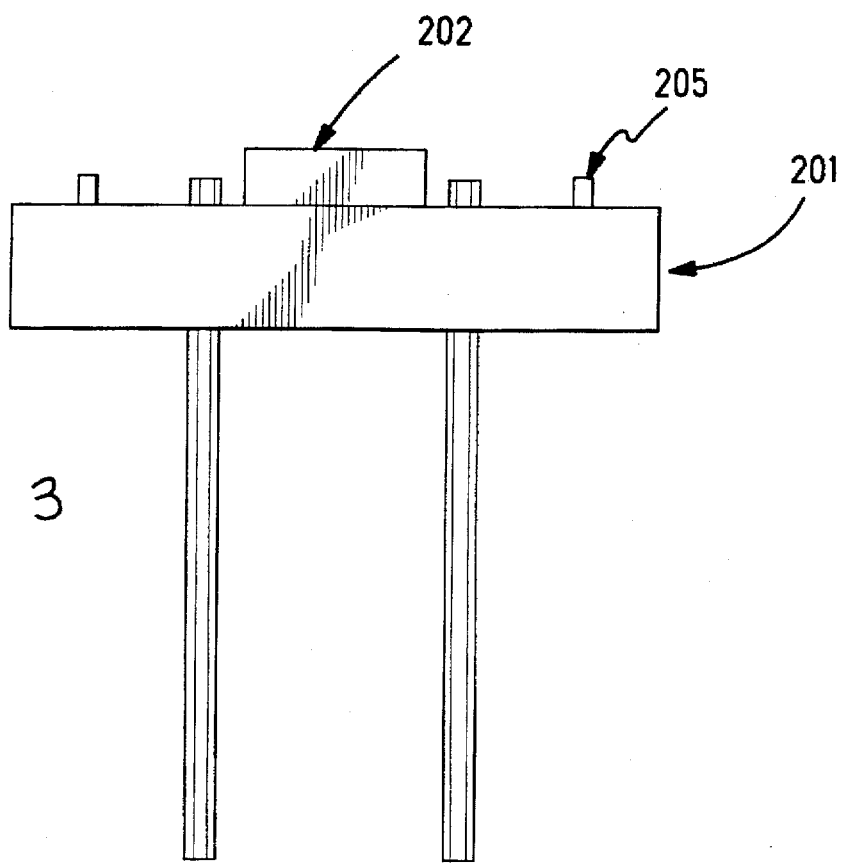
FIG. 3 is a side view of the optical die header of FIG. 2.
Figure 4:
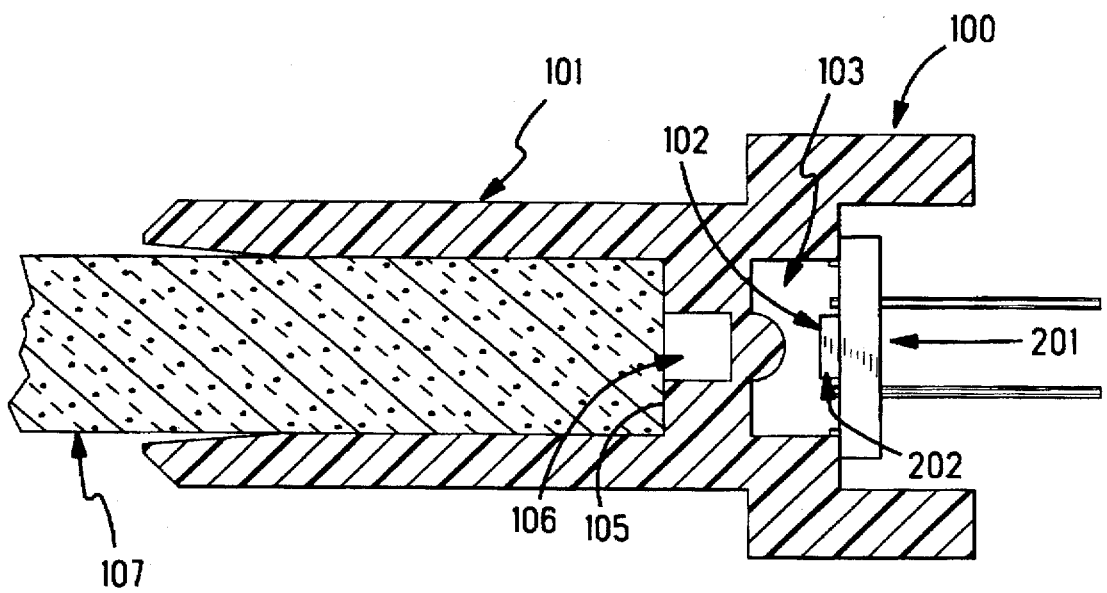
FIG. 4 is a cross sectional view of the integrally molded active device mount assembly of the present invention.
Figure 5:
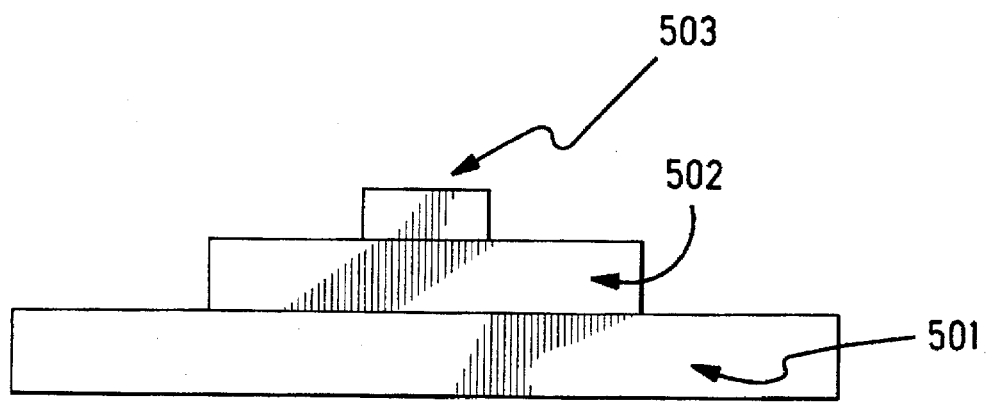
FIG. 5 is a cross-sectional view of the preferred header assembly of the present invention.

As is shown in FIG. 2 a standard optical die header 201 has an optoelectronic device 202, for example a PIN diode for reception of light or a laser or LED for transmission of light. The header 201 is made preferably of ceramic although other materials such as other epoxy resins, FR4, aluminum nitride or aluminum will suffice. It is clear that a variety of optoelectronic device can be used in this assembly, and those which are disclosed merely for exemplary purposes. Bonding pads 203 and 204 are shown to effect the proper electrical connection between the optoelectronic device 202 and electronic circuitry, not shown. FIG. 5 shows the header of the preferred embodiment of the present invention. The base of the header 501 is preferably ceramic and has mounted thereto a ceramic subassembly 502 with the optoelectroinc device 503 mounted thereon. The header assembly shown in FIG. 5 enables accurate placement of the optoelectronic device and the subsequently an improved alignment capability of the header into the active device mount. To this end, conventional die attachment equipment is limited by the surface area and thickness of the die which is to be placed. Accordingly, with conventional equipment, it is relatively difficult to accurately place an element as small as the optoelectronic device 503. However, conventional die attachment equipment enables accurate placement of pieces the size of the ceramic subassembly 502. Accordingly, the optoelectronic device is placed on the ceramic subassembly 502, which is thereafter accurately placed in very tight tolerance on the base 501. The ceramic base 501 having the subassembly 502 accurately located on it thereafter is used as the passive alignment means for lining the header assembly in the active device mount. To this end, the dimensions of the ceramic base 501 are chosen with great accuracy to match the inside dimensions of the cavity 103. Accordingly, the ceramic base 501 effects passive alignment in the x and y direction of the optical die header in the assembled active device mount. In a less preferred embodiment, a solder mask or other suitable ridge 205 forms a substantially rectangular or square perimeter about the region in which the optoelectronic device is mounted. This ridge is used primarily to effect passive alignment in the x and y direction of the optical die header in the assembled active device mount. Further details will be disclosed herein.

Figure 6:
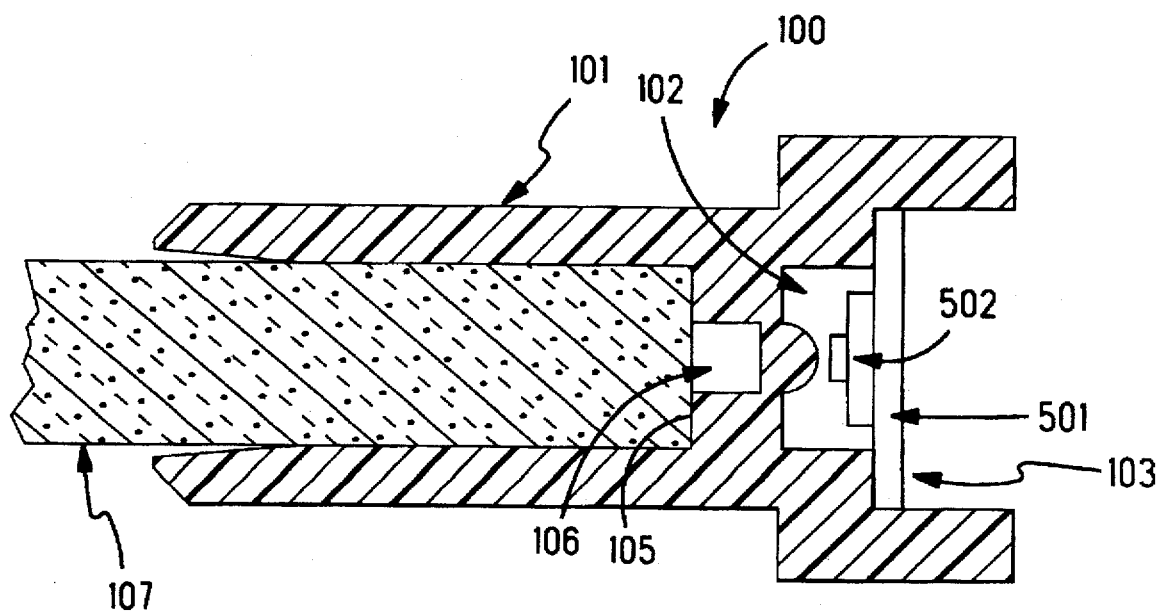
FIG. 6 is a cross-sectional view of an alternative header assembly of the present invention.

Finally, turning to FIG. 6, the active device mount having the alignment sleeve for the optical fiber 101 the integrally molded optical lens 102 and the optical die header having a base and subassembly 501 and 502, respectively are shown in assembled form. In an embodiment in which the optoelectronic device 503 is a light receiving device, for example a PIN diode or other suitable light detector, light traversing the optical fiber mounted in the sleeve 101 will be impingent upon the lens 102 and focused on the active area of the PIN diode or other suitable detector 503. To this end, the lens is a converging lens in the reception mode, and effects proper optical transmission of light from the optical fiber to the optoelectronic device 503. Conversely, in an application of the present invention where the optoelectronic device 202 is a transmitter, for example an LED, the arrangement of the various parts is substantially identical to the application where the device 503 is a detector. To this end, the optical fiber is in optical communication with the light transmitting device 503 byway of the lens. Light emitted from the optoelectronic device 503 is impingent upon the lens 102 which focuses the light within the acceptance angle of the optical fiber mounted in the sleeve 101. In this manner optical transmission is effected.

One of the basic aspects of the present invention that can be appreciated from a review of the above disclosure as well as the drawings, is in the simplicity of design and assembly. To this end, the materials used are integrally molded and relatively inexpensive to manufacture. As stated above this has the attendant reduction in the overall price of the finished product. However, another basic advantage of the present invention is in the ability to effectively passively align the optical header to the optical fiber by way of the various elements of the integrally molded part. The cavity 103 is molded with great precision in the molding process of unitary molded piece. As stated above , the dimension of the ceramic base 501 is made to match with great precision dimensions of the cavity 103. Accordingly, the header of the preferred embodiment of the present invention assures accurate yet passive alignment of the header to the active device mount of the present invention. In the less preferred embodiment, in which the ridge member 205 is used for passive alignment, accurate placement and dimensioning of the ridge 205 can be made to match effectively the opening of the cavity. As can be readily appreciated, proper placement of the various elements on the header with respect to this ridge member, and the subsequent placement of the optical header into the cavity, enables an optical header is readily passively aligned. This passive alignment results in a accurately aligned device in the cavity with respect to the lens member 102. Accordingly, by passive alignment of the optical header in the cavity 103 therefore to the lens member 102, the optoelectronic device 202 is readily passively aligned to the optical fiber. As stated above, a further advantage of the present invention in that the overall reduction in complexity of assembly of the various parts and the subsequent alignment is to a very great extent passively effected. Accordingly, the overall cost of fabrication is reduced in comparison to conventional techniques of fabrication.

The invention having been described, it is readily apparent that obvious modifications of the above disclosure can be readily realized by the artisan of ordinary skill. To this end those modifications which are obvious from the disclosure of the integrally molded in-line piece for packaging an optical header in an optoelectronic package are considered within the purview of the invention.

I claim:

1. A device mount for aligning an optical fiber to an optoelectronic device comprising a unitary member having a sleeve for receiving said optical fiber; a lens for optical communications disposed between said optical fiber and a cavity in which an optoelectronic device header is disposed; an optoelectronic device disposed on said header, said header being passively aligned to said optical fiber and said lens; and a ridge disposed about a perimeter of said header to effect said passive alignment.

2. A device mount as recited in claim 1 wherein said unitary member is molded plastic.

3. An active device as recited in claim 1 wherein said optical fiber and said optical header are adhesively fixed to said device mount.

4. A device mount as recited in claim 1 wherein said optical header further comprises an optoelectronic device mounted on a subassembly, said subassembly further mounted on a base member, and said header being passively aligned to said device via said subassembly.

* * * * *